(12) United States Patent
Felch et al.

(10) Patent No.: US 7,850,822 B2
(45) Date of Patent: Dec. 14, 2010

(54) SYSTEM AND METHOD OF WET OXIDATION OF A VISCOSE PROCESS STREAM

(75) Inventors: Chad L. Felch, Mosinee, WI (US); Richard W. Lehmann, Birnamwood, WI (US); Todd J. Wingers, Rothschild, WI (US); Bruce L. Brandenburg, Wausau, WI (US); William M. Copa, Weston, WI (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 1292 days.

(21) Appl. No.: 10/977,137

(22) Filed: Oct. 29, 2004

(65) Prior Publication Data
US 2005/0147554 A1 Jul. 7, 2005

Related U.S. Application Data

(60) Provisional application No. 60/515,272, filed on Oct. 29, 2003.

(51) Int. Cl.
*D21H 11/02* (2006.01)
(52) U.S. Cl. ............... 162/157.7; 162/36; 162/30.1
(58) Field of Classification Search ........... 162/36, 162/157.7, 30.1; 264/188; 423/642
See application file for complete search history.

(56) References Cited

U.S. PATENT DOCUMENTS

| | | | |
|---|---|---|---|
| 2,944,396 A | 7/1960 | Barton | |
| 4,070,281 A | 1/1978 | Tagashira et al. | |
| 4,098,639 A * | 7/1978 | Noreus et al. | 162/30.11 |
| 4,182,648 A | 1/1980 | Pradt et al. | |
| 4,265,747 A | 5/1981 | Copa et al. | |
| 4,372,940 A | 2/1983 | Brandenburg et al. | |
| 4,387,084 A | 6/1983 | Brandenburg et al. | |
| 4,395,339 A | 7/1983 | Chowdhury et al. | |
| 4,461,743 A | 7/1984 | Chowdhury et al. | |
| 4,626,354 A | 12/1986 | Hoffman et al. | |
| 4,749,492 A | 6/1988 | Berrigan, Jr. et al. | |
| 4,810,386 A | 3/1989 | Copa et al. | |
| 4,812,243 A | 3/1989 | Brandenburg et al. | |
| 4,897,196 A | 1/1990 | Copa et al. | |
| 4,919,815 A | 4/1990 | Copa et al. | |
| 5,034,094 A * | 7/1991 | Kurple | 162/16 |
| 5,057,231 A | 10/1991 | Mueller et al. | |
| 5,075,015 A | 12/1991 | Kamke | |

(Continued)

OTHER PUBLICATIONS

Woodings, Calvin Regenerated Cellulose Fibres.. Woodhead Publishing. p. 57-61 Online version available at: http://knovel.com/web/portal/browse/display?_EXT_KNOVEL_DISPLAY_bookid=817&VerticalID=0.*

(Continued)

*Primary Examiner*—Christina Johnson
*Assistant Examiner*—Galen Hauth
(74) *Attorney, Agent, or Firm*—Lando & Anastasi, LLP

(57) ABSTRACT

A wet oxidation process is used to control the concentration of reduced sulfur compounds from a viscose process. The wet oxidation process oxidizes the reduced sulfur compounds to convert such reduced sulfur compounds to an alkali sulfate and/or thiosulfate species. The alkali sulfate stream is recycled to the viscose process. Oxidation is performed under elevated temperature and pressure conditions such that the offgas has an oxygen concentration of between about 2% to 18% and the alkali sulfate stream has a pH of about 2 to 10.

5 Claims, 2 Drawing Sheets

U.S. PATENT DOCUMENTS

| | | | |
|---|---|---|---|
| 5,082,571 A * | 1/1992 | Beula et al. | 210/739 |
| 5,106,513 A | 4/1992 | Hong | |
| 5,183,577 A | 2/1993 | Lehmann | |
| 5,192,442 A | 3/1993 | Piccirillo et al. | |
| 5,192,453 A | 3/1993 | Keckler et al. | |
| 5,230,810 A * | 7/1993 | Clark et al. | 210/743 |
| 5,234,607 A | 8/1993 | Brandenburg et al. | |
| 5,240,619 A | 8/1993 | Copa et al. | |
| 5,244,576 A | 9/1993 | DeRoeck et al. | |
| 5,262,060 A | 11/1993 | Lehmann et al. | |
| 5,268,104 A | 12/1993 | Masoomain | |
| 5,298,174 A | 3/1994 | Momont et al. | |
| 5,302,288 A | 4/1994 | Meidl et al. | |
| 5,310,484 A | 5/1994 | Berrigan, Jr. | |
| 5,340,473 A | 8/1994 | Roberts et al. | |
| 5,368,726 A | 11/1994 | Masoomian | |
| 5,389,259 A | 2/1995 | Berrigan, Jr. | |
| 5,389,264 A | 2/1995 | Lehmann et al. | |
| 5,460,732 A | 10/1995 | Momont | |
| 5,534,148 A | 7/1996 | Suzuki et al. | |
| 5,641,413 A | 6/1997 | Momont et al. | |
| 5,651,897 A | 7/1997 | Lehmann | |
| 5,674,405 A | 10/1997 | Bourhis | |
| 5,885,422 A | 3/1999 | Kurukchi et al. | |
| 5,891,346 A | 4/1999 | Huntley | |
| 6,110,385 A | 8/2000 | Copa et al. | |
| 6,190,564 B1 | 2/2001 | Lehmann et al. | |
| 6,210,583 B1 | 4/2001 | Kurukchi et al. | |
| 6,444,130 B1 | 9/2002 | Manganaro et al. | |

OTHER PUBLICATIONS

Woodings, Calvin Regenerated Cellulose Fibres. Woodhead Publishing. 2001. p. 57-61 Online version availiable at: http://knovel.com/web/portal/browse/display?_EXT_KNOVEL_DISPLAY_bookid=817&VerticalID=0.*

S. Mukherjee et al., "Absorption of Carbon Disulfide in Alkaline Solution—Equipment Selection," 2002 *WEC*, pp. 454-459.

Enneking, Joseph C., "Control of Carbon Disulfide Emissions from Viscose Processes," *Environmental Progress*, Oct. 2002, pp. 169-174, vol. 21, No. 3).

* cited by examiner

… (US 7,850,822 B2)

SYSTEM AND METHOD OF WET OXIDATION OF A VISCOSE PROCESS STREAM

RELATED APPLICATIONS

This application claims priority under 35 U.S.C. §119(e) to U.S. Provisional Application Ser. No. 60/515,272 entitled "SYSTEM AND METHOD OF WET OXIDATION OF A VISCOSE PROCESS STREAM," filed on Oct. 29, 2003, which is herein incorporated by reference in its entirety.

BACKGROUND OF THE INVENTION

1. Field of the Invention

The invention relates to the conversion or control of reduced sulfur species and related compounds formed in a viscose process, and more particularly, to a wet oxidation process for the control of reduced sulfur species and related compounds formed in a viscose processes and recovery of metal sulfate.

2. Description of the Related Art

Efforts aimed at controlling the discharge of species produced from viscose processes have been undertaken. For example, Mukherjee et al. studied the absorption of carbon disulfide vapors in an alkaline solution by spray absorption techniques. Enneking described carbon disulfide control from a viscose process by carbon bed adsorption techniques. However, these processes typically have operational and economic limitations.

Thus, there is a need for systems and methods that control reduced sulfur compound emissions from viscose processes that are effective, economical, and readily integrated into the overall flow scheme of the viscose process.

BRIEF SUMMARY OF THE INVENTION

The invention is directed to a process for the conversion, destruction, or control of reduced sulfur compounds from a viscose process.

In accordance with one or more embodiments, the invention provides a method of treating a viscose process stream. The method comprises a step or act of oxidizing a reduced sulfur compound in the viscose process stream to produce a treated alkali metal sulfate liquid stream.

In accordance with one or more embodiments, the invention provides a method of treating reduced sulfur compounds in a viscose process stream. The process comprises steps or acts of forming an alkaline solution of sodium cellulose xanthate, treating the sodium cellulose xanthate solution to produce a regenerated cellulose material and at least one stream comprising reduced sulfur compounds, oxidizing in the liquid phase the at least one stream comprising reduced sulfur compounds with air while maintaining about 5% to about 9% oxygen concentration in the off-gas, at an elevated temperature in the range of about 200° C. to about 220° C. and superatmospheric pressure for a duration of at least about 15 minutes, to produce a treated liquid stream having a pH in the range of about 2 to about 7, and crystallizing sodium sulfate from the treated liquid stream. The method can further comprise introducing at least a portion of the crystallized sodium sulfate to the viscose process. The treated liquid stream comprises sodium sulfate In accordance with one or more embodiments, the invention provides a system for treating a viscose process mother liquor. The system comprises a reduced sulfur species outlet from the viscose process mother liquor, an oxidant source fluidly connected to the reduced sulfur species outlet, and a reactor fluidly connected downstream of the oxidant source and the reduced sulfur species outlet. The reactor comprises a sodium sulfate stream outlet. The system further comprises a separator fluidly connected to the sodium sulfate stream outlet. The separator comprises a liquid phase outlet and a gaseous phase outlet.

In accordance with one or more embodiments, the invention provides a method of wet oxidation of a viscose process mother liquor. The method comprises a step of retrieving the viscose process mother liquor comprising at least one reduced sulfur species selected from the group consisting of carbon disulfide, hydrogen sulfide, sodium thiocarbonate, sodium thiosulfate, and sodium sulfite. The method further comprises a step of oxidizing at least a portion of the reduced sulfur species at a pressure and temperature sufficient to produce an alkali sulfate stream having a pH of less than about 10.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non-limiting embodiments of the invention will be described by way of examples with reference to the accompanying drawings, in which.

DETAILED DESCRIPTION OF THE INVENTION

Figure 1:
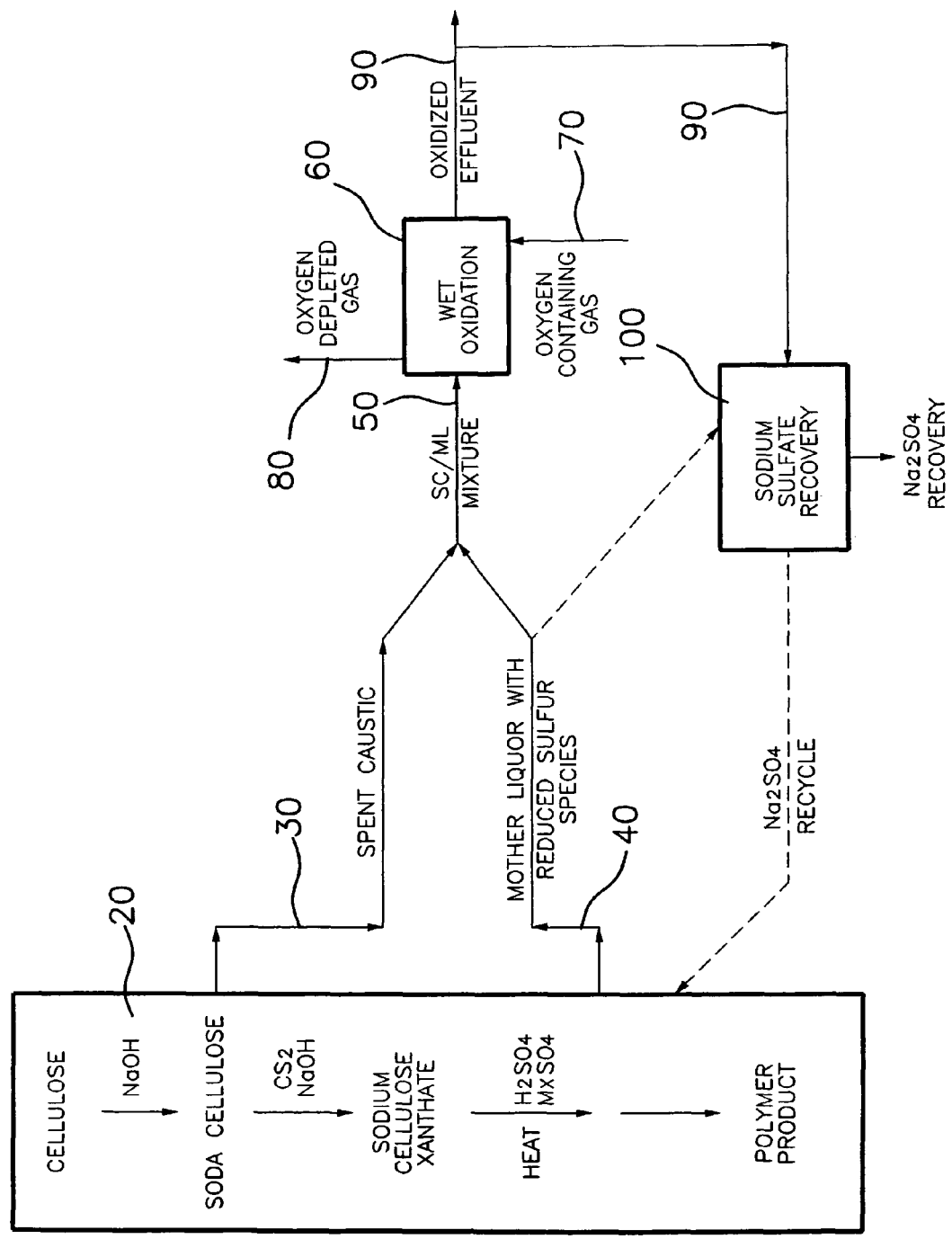
FIG. 1 is a process flow diagram showing a viscose process coupled with a wet oxidation system in accordance with one or more embodiments of the invention.

Several industrial products can be manufactured by the viscose process, including, for example, cellulosic products, sausage casings and rayon fibers. The viscose process typically involves treating cellulose material, such as wood pulp, with an alkali solution comprising, for example, sodium hydroxide, to produce a treated material, typically referred to as soda cellulose. The soda cellulose can be further processed with carbon disulfide to produce sodium cellulose xanthate, which is typically soluble in a caustic solution of sodium hydroxide. Sodium cellulose xanthate is typically a yellow solid and, when dissolved in a dilute solution of alkali, can become a viscous, honey-colored liquid. The caustic solution of sodium cellulose xanthate is typically processed to produce regenerated cellulose in the form of cellulosic products, films, or fibers. Regenerated cellulose fibers are known as rayon.

The conversion of sodium cellulose xanthate into regenerated cellulose can also produce byproducts such as carbon disulfide and other reduced sulfur compounds or species. For example, if fiber is produced, spinning is typically performed in a bath containing metal sulfates and sulfuric acid. Reduced sulfur species such as, but not limited to carbon disulfide and hydrogen sulfide, can be produced as the sodium cellulose xanthate reacts to form the regenerated cellulose fibers. In the formation of the regenerated cellulose cellulosic products, crystals of sodium sulfate are typically dispersed in an alkaline brine matrix comprising sodium cellulose xanthate. The resulting mixture is typically heated to at least about 100° C. to promote the conversion of the sodium cellulose xanthate into regenerated cellulose product, typically having crystals of sodium sulfate disposed therein. The sodium sulfate crystals are typically dissolved from the cellulosic product. An alkaline brine solution comprising dissolved sodium sulfate, which typically contains reduced sulfur compounds or species, is then separated from the cellulosic product. Cellulose regeneration and further processing by viscose processes typically generates a number of aqueous and/or gaseous streams containing carbon disulfide ($CS_2$) and other reduced sulfur compounds, including, for example, hydrogen sulfide ($H_2S$), sodium thiocarbonate ($Na_2CS_3$), sodium thiosulfate ($Na_2S_2O_3$), sodium sulfite ($Na_2SO_3$), and sulfur (S). These compounds can be considered pollutants, which would typically require conversion, control, removal, or destruction before discharge to the environment. In particular, carbon disulfide and hydrogen sulfide emissions are regulated by the government entities.

In accordance with one or more embodiments of the invention, wet oxidation techniques can be utilized to promote the destruction of pollutants, such as reduced sulfur species in waste streams, e.g. wastewater, from one or more sources thereof such as, but not limited to, viscose processes. The wet oxidation processes and systems in accordance with the invention can comprise treatment of the wastewater with an oxidant, such as molecular oxygen from, for example, an oxygen-containing gas, at particular conditions, e.g. at elevated temperatures and pressures, that convert or control such undesirable species.

FIG. 1 shows a process flow diagram in accordance with one or more embodiments of the invention in which a source of undesirable species, a viscose process 20, is coupled with a wet oxidation system 60. Viscose process 20 typically involves treating cellulose, such as wood pulp, with a solution of sodium hydroxide to produce a material, termed soda cellulose. A spent caustic stream 30 is typically generated along with the soda cellulose product. The soda cellulose can be treated with carbon disulfide to produce sodium cellulose xanthate, which is typically dissolved in a dilute caustic solution, typically comprising sodium hydroxide. The caustic solution of sodium cellulose xanthate can be treated by various techniques with various reagents to produce regenerated cellulose in the form of cellulosic products, films, or fibers. The regenerated cellulose product typically results from the decomposition of sodium cellulose xanthate with the production of carbon disulfide and other reduced sulfur species. Fiber spinning can be carried out using a bath containing metal sulfates and/or sulfuric acid. Cellulosic product formation typically employs crystalline metal sulfate, dispersed within a sodium cellulose xanthate matrix, heated to produce the regenerated cellulose cellulosic product. The regeneration processes typically result in a mother liquor stream 40, which typically contains reduced sulfur species, such as carbon disulfide, hydrogen sulfide, sodium thiocarbonate, sodium thiosulfate, sodium sulfite, and sulfur, as well as sodium sulfate. In some cases, the mother liquor 40 is maintained at an alkaline pH to minimize gaseous discharge of reduced sulfur species such as hydrogen sulfide. The mother liquor 40 can be combined with at least a portion of the spent caustic stream 30, produced from the production of sodium cellulose.

The resultant waste or discharge stream comprising caustic, mother liquor stream mixture 50 can be treated by wet oxidation system 60 to convert, control, reduce, or destroy any reduced sulfur compounds in the caustic, mother liquor stream mixture 50. In accordance with some embodiments of the invention, the wet oxidation process or system 60 can comprise systems and techniques involving oxidation of the stream 50 with an oxidant 70 at preferential conditions such as at elevated temperature and superatmospheric pressure to convert at least partially, or preferably essentially all, reduced sulfur species to sulfate species. Elevated temperature can be any temperature above ambient temperature that allows oxidation of reduced sulfur species to a sulfate species and/or thiosulfate species. For example, the elevated temperate can range from about 130° C. to about 260° C. The systems and techniques of the invention can be utilized at temperatures below 135° C. and above 260° C. However, at temperatures below 130° C., oxidation would proceed at a reduced rate. Conversely, at temperatures above 220° C., oxidation would still occur but the associated capital costs may become prohibitive. Further, higher temperatures may increase the likelihood of charring of organic material, e.g., solubilized cellulose. Oxidant 70 can comprise any oxygen-containing gas, such as but not limited to, oxygen, oxygen-enriched air, and any gas having sufficient oxygen content that, at least partially, oxidizes one or more reduced sulfur species. Gas having oxygen consumed therefrom would be typically discharged from wet oxidation system 60 as oxygen-depleted gas or off-gas 80. In other embodiments in accordance with the invention, at least a portion of an oxidized effluent stream 90 from the wet oxidation system 60 can be directed to a sodium sulfate recovery unit 100 where sodium sulfate can be recovered by, for example, crystallization, from the oxidized effluent stream 90. Preferably, sodium sulfate is recovered as a crystalline solid that can be recycled to the viscose process 20. In an alternative embodiment of the invention, a portion of the mother liquor stream 40, having reduced sulfur compounds, can be combined with a portion of the oxidized effluent stream 90 in the sodium sulfate recovery unit 100.

Reduced sulfur species, thiocarbonate species ($CS_3^{-2}$) such as sodium thiocarbonate ($Na_2CS_3$) as well as sodium bisulfide (NaHS), can be present in the mother liquor of a viscose process. When the mother liquor is treated in the wet air oxidation system, a series of hydrolysis and oxidation reactions can occur. Under alkaline conditions and at low temperature, within the range of about 120° to about 160° C., it is believed that sodium thiocarbonate can be hydrolyzed according to equation (1).

$$Na_2CS_3 + H_2O \rightarrow CS_2 + NaHS + NaOH \tag{1}$$

Carbon disulfide is typically further hydrolyzed according to equation (2).

$$CS_2 + 4NaOH \rightarrow Na_2CO_3 + 2NaHS + H_2O \tag{2}$$

Sodium bisulfide can be further oxidized to sodium thiosulfate at these temperatures according to equation (3).

$$2NaHS + 2O_2 \rightarrow Na_2S_2O_3 + H_2O \tag{3}$$

Under favorable conditions, e.g. if the temperature in the wet air oxidation system increases, the sodium thiosulfate and the sodium bisulfide can be oxidized to form sodium bisulfate ($NaHSO_4$) according to equations (4) and (5).

$$NaHS + 2O_2 \rightarrow NaHSO_4 \tag{4}$$

$$Na_2S_2O_3 + 2O_2 + H_2O \rightarrow 2NaHSO_4 \quad (5)$$

The mother liquor comprising sodium thiocarbonate can also comprise free sodium hydroxide. However, as the hydrolysis and wet air oxidation reactions proceeds, the free sodium is typically consumed according to equation (2), for the hydrolysis reaction. The free hydroxide can also be consumed during neutralization of the acidic reaction products, formed in accordance with in equations (4) and (5), according to equation (6).

$$NaHSO_4 + NaOH \rightarrow Na_2SO_4 + H_2O \quad (6)$$

As a consequence of the consumption of the free sodium hydroxide, the pH of the reaction mixture typically decreases as the reaction proceeds. The pH of the wet air oxidized effluent is determined by the amount of free NaOH that is initially in the reaction mixture or added to the reaction mixture and the extent of conversion of reduced sulfur species.

Figure 2:
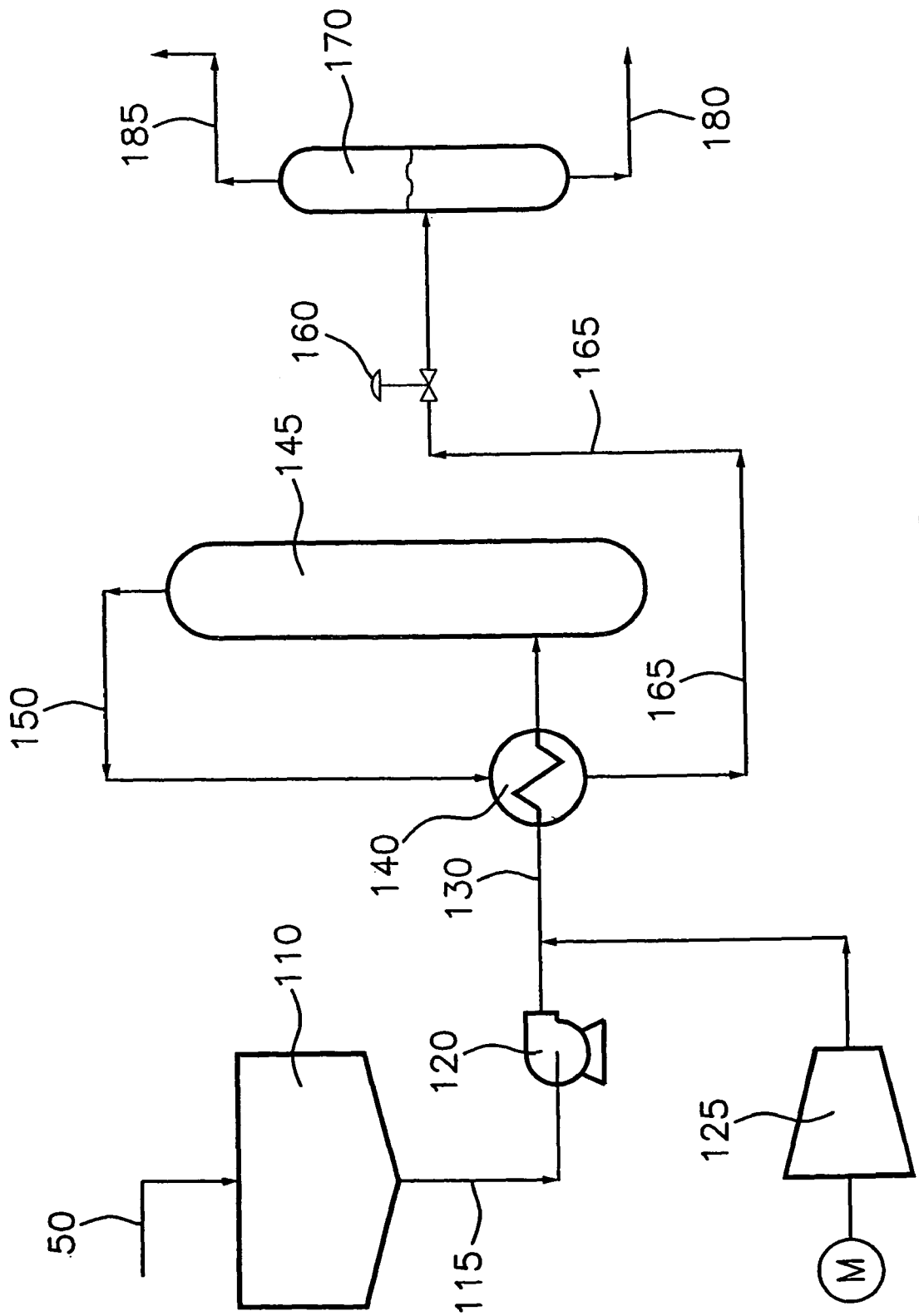
FIG. 2 is a process flow diagram showing a wet oxidation system in accordance with one or more embodiments of the invention.

FIG. 2 is a process flow diagram showing a wet oxidation system in accordance with one or more embodiments of the invention. The wet oxidation system can comprise a source of an alkaline aqueous mixture comprising reduced sulfur species such as, but not limited to, a storage tank 110 that can store the alkaline aqueous mixture from, for example, viscose process 20. The alkaline aqueous mixture can be retrieved through conduit 115 from storage tank 110 and introduced into a reactor vessel 145. In reactor 145, reduced sulfur species can be oxidized, reacted, destroyed, or converted to a recyclable, dischargeable, or recoverable species so as to reduce or control the concentration of the reduced sulfur species to within acceptable discharge limits or convert to a reusable, recoverable species. Preferably, the reduced sulfur compounds can be converted to an alkali metal sulfate that can be utilized in one or more upstream or downstream systems. Unconsumed reactants and reaction products typically exits reactor 145 through conduit 150 and transfers to a separation unit operation or separator 170. Exiting stream, flowing in conduit 150, is typically a two-phased stream comprising a gaseous phase and a liquid phase. The liquid phase and the gaseous phase can be separated in separator 170, each respectively leaving as liquid effluent in conduit 180 and as gaseous effluent in conduit 185. The liquid effluent can be further processed to remove any desirable or undesirable species therefrom. For example, sodium sulfate species in the liquid effluent stream can be separated in sodium sulfate recovery system 100 as shown in FIG. 1.

Preferably, pump 120 provides sufficient motile force for transferring the alkaline aqueous mixture from storage tank 110 to reactor 145. For example, pump 120 can pressurize the alkaline aqueous mixture to a pressure of at least above atmospheric, i.e. superatmospheric pressure, e.g. greater than 14.7 psia. However, those skilled in the art would recognize that other techniques or unit operations could be utilized to provide a pressure difference sufficient to promote fluid transport and/or to raise the pressure to superatmospheric pressure, such as, but not limited to, utilizing elevational/gravitational forces to provide sufficient head pressure.

In accordance with one or more embodiments of the invention, an oxidizing agent can be introduced into the alkaline aqueous mixture. The oxidizing agent can comprise any species that reacts to control, e.g. by oxidation, the concentration of any reduced sulfur species in the alkaline aqueous mixture. For example, the oxidizing agent can comprise an oxygen-containing gas 70 such as, but not limited to, air, oxygen-enriched air, pure oxygen, or mixtures thereof. Preferably, the oxidizing agent is introduced in conduit 130 upstream of reactor vessel 145 to promote mixing of the oxidizing agent in the alkaline aqueous mixture. In some embodiments, the oxidizing agent is introduced into the alkaline aqueous mixture in an amount sufficient to oxidize at least a portion of any reduced sulfur species in the alkaline aqueous mixture. In other embodiments, the oxidizing agent can be mixed in a stoichiometric amount relative to the concentration of the reduced sulfur species in the alkaline aqueous mixture. In still other embodiments, the oxidizing species can be mixed into the alkaline aqueous mixture in stoichiometric excess. The oxidizing agent can be introduced into the alkaline aqueous mixture by any technique sufficient to promote oxidation. For example, oxygen-containing gas can be introduced into the alkaline aqueous mixture from compressed gas containers, e.g. one or more compressed air tanks by utilizing various techniques and systems such as, but not limited to, bubblers, contactors or any other unit operation that effects mass transfer. Typically, the pressurized oxygen-containing gas has a pressure that is superatmospheric and/or sufficient to overcome the head pressure in conduit 130 and/or at the discharge of pump 120. Alternatively, in accordance with further embodiments of the invention, exemplarily depicted in FIG. 2, oxygen-containing gas can be pressurized by a compressor 125 and injected into the alkaline aqueous mixture. Compressor 125 can comprise one or more types of unit operations that increase the pressure of the oxygen-containing gas. For example, compressor 25 can comprise one or more centrifugal-type, axial-type, rotary-type, and reciprocating-type compressors. The size and capacity of compressor 125 typically depends on several factors including, inter alia, the oxygen content of the oxygen-containing gas, the stoichiometric amount of oxygen required, the required delivery pressure, and the upstream pressure of the oxygen-containing gas.

Reactor 145 can comprise any unit operation that allows initiation, control, and/or progression of a reaction that oxidizes any reduced sulfur species in the alkaline aqueous mixture. For example, reactor 145 can comprise one or more reactors such as a tank-type reactor, a continuous stirred tank reactor, a fluidized-bed reactor, a tower reactor, and a slurry-phase reactor. Moreover, oxidation of reduced sulfur species can be performed in batch operations, continuous operations, plug-flow conditions, or combinations thereof. In accordance with one or more embodiments of the invention, exemplary depicted in FIG. 2, reactor 145 comprises a pressure vessel designed and constructed to operate at the oxidation reaction pressure and temperature conditions. For example, the wall thickness of reactor 145 will depend on, inter alia, the materials of construction, the operating and/or maximum pressure, the operating and/or the upper and lower temperature conditions. Further, those skilled in the art can select materials of construction appropriate for the anticipated reaction conditions. For example, reactor 145 can be constructed of stainless steel or carbon steel having a glass liner or other chemical resistant coating. Reactor 145 can also be sized to allow at least partial completion of at least one oxidation reaction of any reduced sulfur species in the alkaline aqueous mixture. For example, in accordance with one or more embodiments of the invention, reactor 145 comprises one or more tank reactors, in parallel and/or series, sized to provide a residence time sufficient to allow oxidation of one or more reduced sulfur species to one or more alkali metal sulfate species such as sodium sulfate. The residence time can depend on several factors including, but not limited to, the reactant concentration, reactant flow rates, reaction temperature, reaction pressure, and the effective rates of reactions. Preferably, reactor 145 is sized to provide sufficient residence time to permit at least partial oxidation of reduced sulfur compounds. More preferably, reactor 145 is sized to have a residence time of at least about 15 minutes and preferably, at least about 60 minutes.

In accordance with one or more embodiments of the invention, a heat exchange unit operation or heater 140 can be utilized to introduce heat into the alkaline aqueous mixture before its introduction into reactor 145. Heat exchanger 140 can comprise any heat exchange apparatus or system that can promote heat transfer from a heating fluid into the alkaline aqueous mixture to raise the temperature of the alkaline aqueous mixture. For example, the heat exchange unit operation can comprise one or more shell-and-tube type heat exchangers, plate-and-frame heat exchangers, fired heaters or other similar suitable equipment that can effect heat transfer. In some cases, heat exchanger 140 provides heat transfer from the alkaline aqueous mixture to a cooling medium. In accordance with one or more embodiments of the invention, the aqueous alkaline mixture, typically comprising reduced sulfur species, is heated to initiate, promote, and/or maintain an oxidation reaction of the reduced sulfur species in the alkaline aqueous mixture. For example, the temperature of alkaline aqueous mixture can be maintained or raised to at least about 130° C. In some cases, the alkaline aqueous mixture temperature is maintained or raised to at least about 150° C. and in other cases, the alkaline aqueous mixture temperature is maintained or raised to between about 135° C. to about 220° C. Those skilled in the art would also recognize that heat exchange unit operation 140 can be incorporated or substituted as a cooling/heating jacket around reactor 145. Thus, in accordance with some embodiments of the invention, alkaline aqueous mixture can flow into and be heated in a jacket (not shown) or heat transfer coil surrounding or disposed in reactor 145 before being introduced into reactor 145. In accordance with other embodiments of the invention, the temperature of the alkaline aqueous mixture can be raised by steam injection. Any system or technique suitable for providing steam, saturated or superheated steam, can be utilized.

Separator 170 can comprise one or more apparatus that effect phase separation of mixed phase stream. In accordance with one or more embodiments of the invention, separator 170 can effect separation of a gaseous phase from a liquid phase of a mixed-phase stream. For example, a mixed-phase stream comprising a gaseous phase and a liquid phase from reactor 145 and flowing in conduit 165 can be separated into respective phases in separator 170. Separator 170 can comprise any unit operation that can effect a phase separation. For example, separator 170 can comprise an impingement-type separator, a gravity settler, a centrifugal separator, or combinations thereof. The design, including size and materials of construction, of separator 170 would depend on several factors including, inter alia, the required separation efficiency, the residence time, the settling rate as well as the operating temperature and pressure.

Alkali metal sulfate, e.g., sodium sulfate, can be crystallized by utilizing various systems and techniques. Examples of suitable crystallization equipment in accordance with the invention include those based on mixed-suspension, force-circulation evaporation, and other evaporator-type crystallizers. Moreover, crystallizer 100, in accordance with one or more embodiments of the invention, may also incorporate enhancement techniques including, for example, reaction-type crystallizers and recirculation-type crystallizers.

The function and advantage of these and other embodiments of the invention will be more fully understood from the examples below. The following examples are intended to illustrate the benefits of the invention, but do not exemplify the full scope of the invention.

EXAMPLES

In the following Examples, simulated, caustic mother liquor mixtures are treated by hydrolysis or wet oxidation at various elevated temperatures in accordance with one or more embodiments of the invention to investigate control or destruction of reduced sulfur species therein.

Example 1

Hydrolysis of a Caustic Mother Liquor

A feed solution was prepared by dissolving about 16 grams of sodium hydroxide in distilled water and adding about 10 grams of carbon disulfide to the caustic solution. Stirring the mixture until the carbon disulfide dissolved produced an orange solution, which was made up to about one liter with distilled water. A portion of the orange feed solution was placed in an autoclave, and the head space was purged with nitrogen gas. The autoclave containing the feed solution was heated to temperature for about 15 minutes, then it was cooled with tap water to room temperature, and the resulting solution removed from the autoclave and analyzed. The analyses of the feed and effluent samples are shown in Table I.

TABLE I

Superatmospheric Hydrolysis of Caustic Carbon Disulfide at Temperature for About 15 minutes.

| Test No. | Feed | 1 | 2 | 3 |
|---|---|---|---|---|
| Temperature, ° C. | — | 150 | 175 | 200 |
| pH | 12.9 | 9.75 | 9.69 | 9.85 |
| COD, mg/L | 13,400 | 13,300 | 13,500 | 13,300 |
| Sulfide sulfur, mg/L | 1,010 | 6,300 | 6,500 | 6,750 |
| $CS_3$, mg/L | 6,027 | <18 | <18 | <18 |
| $S_2O_3$, mg/L | — | 2,816 | 2,943 | 3,326 |
| $SO_3$, mg/L | — | 916 | 960 | 1,140 |
| $SO_4$, mg/L | — | <55 | <55 | 59 |

Although the thiocarbonate species was extensively removed by hydrolysis at each of the elevated temperatures examined, high concentrations of reduced sulfur species remained in the hydrolyzed liquid phase. Little, if any, of the chemical oxygen demand of the feed solution was removed by hydrolysis, and the sulfate content of the hydrolyzed liquid phase was minimal.

Example 2

Oxidation of a Caustic Mother Liquor

A feed solution was prepared by dissolving about 26.5 grams of sodium hydroxide in distilled water and adding about 10 grams of carbon disulfide to the caustic solution. Stirring the mixture until the carbon disulfide dissolved produced an orange solution, which was made up to about one liter with distilled water. A portion of the orange feed solution was placed in an autoclave, and the head space was pressurized with sufficient air to exceed the chemical oxygen demand of the feed solution. The pressurized autoclave containing the feed solution was heated to various temperatures for about 15 minutes, and then it was cooled with tap water to room temperature. The head space gases were analyzed to ensure residual oxygen was present and the resulting solutions were removed from the autoclave and analyzed. The analyses of the feed and effluent samples are shown in Table II.

TABLE II

Superatmospheric Oxidation of Caustic Carbon Disulfide at Various Temperatures for About 15 minutes.

| Test No. | Feed | 4 | 5 | 6 |
|---|---|---|---|---|
| Temperature, ° C. | — | 150 | 175 | 200 |
| pH | 13.38 | 9.12 | 8.86 | 9.18 |
| COD, mg/L | 14,800 | 681 | 113 | 140 |
| Sulfide sulfur, mg/L | 1,240 | <1 | <1 | <1 |
| $CS_3$, mg/L | 7,430 | <18 | <18 | <18 |
| $S_2O_3$, mg/L | — | 389 | 38 | 26 |
| $SO_3$, mg/L | — | 116 | 10 | 4 |
| $SO_4$, mg/L | — | 5,220 | 8,100 | 7,940 |

Wet oxidation at each of the temperatures examined resulted in significant removal of chemical oxygen demand. The concentration of sulfide and thiocarbonate species were reduced to below detection limits at all temperatures. Only low concentrations of thiosulphate and sulfite remained in the oxidized samples, with the large majority of sulfur measured as sulfate. Thus, wet oxidation treatment of simulated, caustic mother liquor provides effective control or destruction of reduced sulfur species in streams, with conversion to sulfate species.

Example 3

Wet Air Oxidation of Synthesized Viscose Mother Liquor a. Preparation of Synthetic Viscose Mother Liquor:

Synthetic viscose mother liquor, with greater quantity of sodium hydroxide added, was prepared by dissolving the following reagent chemicals in about one liter of deionized water:

About 10 g of Carbon Disulfide ($CS_2$)
About 13.9 g of Sodium Sulfide ($Na_2S$)
About 2.5 g of Sodium Thiosulfate ($Na_2S_2O_3$)
About 2.5 g of Sodium Sulfite ($Na_2SO_3$)
About 30 g of Sodium Hydroxide (NaOH)

Synthetic viscose mother liquor with lower quantity of sodium hydroxide added, was prepared by dissolving the following reagent chemicals in about one liter of deionized water:

About 10 g of Carbon Disulfide ($CS_2$)
About 13.9 g of Sodium Sulfide ($Na_2S$)
About 2.5 g of Sodium Thiosulfate ($Na_2S_2O_3$)
About 2.5 g of Sodium Sulfite ($Na_2SO_3$)
About 20 g of Sodium Hydroxide (NaOH)

The Synthesized viscose mother liquor samples were subsequently analyzed for the Chemical Oxygen Demand (COD), pH, and reduced sulfur compounds ($CS_3^{=}$, $S^{=}$, $S_2O_3^{=}$, and $SO_3^{=}$). The analytical results are reported in Table III.

TABLE III

Analysis of Synthesized Viscose Mother Liquor Samples.

| Analysis | Synthesized Viscose Mother Liquor - Lower Quantity of NaOH Added | Synthesized Viscose Mother Liquor - Higher Quantity of NaOH Added |
|---|---|---|
| COD | 27,457 | 27,350 |
| pH | 12.6 | 12.6 |
| $CS_3^-$, mg/L as S | 17,047 | 16,310 |
| $S^-$, mg/L as S | 7730 | 9131 |
| $S_2O_3^-$, mg/L as S | 1177 | 1239 |
| $SO_3^-$, mg/L as S | 71.3 | 71.3 |
| $SO_4^-$, mg/L as S | 261 | 264 |
| Total Reduced Sulfur, mg/L as S | 26,025 | 26,751 | b. Wet Air Oxidation Tests:

The synthesized viscose mother liquors were subsequently wet air oxidized at various temperatures and various times at temperature. A $2^3$ test matrix that was used for conducting the wet air oxidation tests as follows:

| TEST # | Temperature ° C. | Time min. | NaOH Added g/L |
|---|---|---|---|
| 1 | 250 | 60 | 30 |
| 2 | 150 | 60 | 30 |
| 3 | 250 | 15 | 30 |
| 4 | 150 | 15 | 30 |
| 5 | 250 | 60 | 20 |
| 6 | 150 | 60 | 20 |
| 7 | 250 | 15 | 20 |
| 8 | 150 | 15 | 20 |

The wet air oxidation tests were conducted by placing a portion of the synthesized viscose mother liquor in an autoclave and pressurizing the head space with sufficient compressed air to exceed the chemical oxygen demand. The pressurized autoclave containing the synthesized viscose mother liquor was heated to various temperatures and held at temperature for various times, and was then cooled to room temperature with tap water. The head space gases were analyzed to ensure that residual oxygen was present and the resulting solutions were removed from the autoclave and analyzed. The analyses of the wet air oxidized effluents are shown in Table IV.

c. Discussion of the Wet Air Oxidation Results:

The results of the wet air oxidation of the synthesized viscose mother liquor indicate that a very high conversion of total reduced sulfur was achieved under all of the conditions tested. Essentially all of the thiocarbonate and sulfide were completely oxidized at all of the wet air oxidation test conditions. Only small concentrations of thiosulfate and sulfite remained in the oxidized effluents. The 30 g/L quantity of sodium hydroxide that was added to the synthesized mother liquor was sufficient to neutralize the acid (i.e., $NaHSO_4$) that was formed in the oxidation reactions and prevent the formation of elemental sulfur. However, elemental sulfur was formed in the some of the tests that were conducted in which the 20 g/L quantity of sodium hydroxide was added. In these tests, the pH of the oxidized effluents were all below about 3. Solid particles of sulfur were observed in tests #6 and #8. Test #8 had the greatest amount of elemental sulfur.

When actual viscose mother liquor is wet air oxidized, sodium hydroxide or spent caustic will need to be added to the mother liquor to control the pH of the oxidized effluent. Since high concentrations of thiocarbonate and sulfide are anticipated in the viscose mother liquor, a sufficient amount of sodium hydroxide or other alkalinity will need to be added to the mother liquor to prevent the formation of elemental sulfur during the wet air oxidation treatment. Elemental sulfur can be formed in the following sequence of reactions.

TABLE IV

Wet Air Oxidation of Synthesized Viscose Mother Liquor at Various Temperatures and Various Times at Temperature

| | Test # | | | | | | | |
|---|---|---|---|---|---|---|---|---|
| | 1 | 2 | 3 | 4 | 5 | 6 | 7 | 8 |
| Temperature, ° C. | 250 | 150 | 250 | 150 | 250 | 150 | 250 | 150 |
| Time at Temp., min. | 60 | 60 | 15 | 15 | 60 | 60 | 15 | 15 |
| Quantity of NaOH Added, g/L | 30 | 30 | 30 | 30 | 20 | 20 | 20 | 20 |
| COD | <142 | 299 | <142 | <214 | <142 | 1225 | <142 | 3034 |
| pH | 9.7 | 9.7 | 9.9 | 10.0 | 1.8 | 1.9 | 2.5 | 2.4 |
| $CS_3^=$, mg/L as S | <21 | <21 | <21 | <21 | <21 | <21 | <21 | <21 |
| $S^=$, mg/L as S | <1 | <1 | <1 | <1 | <1 | <1 | <1 | <1 |
| $S_2O_3^=$, mg/L as S | 15.5 | 49.5 | 37.2 | 43.4 | 24.8 | 123.9 | 24.8 | 885.8 |
| $SO_3^=$, mg/L as S | 0.1 | 0.7 | 1.3 | 1.2 | 0.1 | 10.7 | 0.4 | 76.2 |
| $SO_4^=$, mg/L as S | 15,700 | 14,400 | 14,900 | 13,500 | 18,300 | 16,100 | 13,800 | 13,000 |
| Total Reduced Sulfur (TRS), mg/L as S | 16.6 | 50.2 | 38.5 | 44.6 | 24.9 | 134.6 | 25.2 | 962.0 |
| % Reduced Sulfur Conversion | 99.9 | 99.8 | 99.9 | 99.8 | 99.9 | 99.5 | 99.9 | 96.3 |

The tri-thiocarbonate and sulfide in the mother liquor can react, at low temperature, as follows:

$$Na_2CS_3 + H_2O \rightarrow CS_2 + NaHS + NaOH \quad (1)$$

The carbon disulfide, $CS_2$, that is formed is further hydrolyzed as follows:

$$CS_2 + 4NaOH \rightarrow Na_2CO_3 + 2NaHS + H_2O \quad (2)$$

The sodium bisulfide that is originally present in the mother liquor or which is formed from the hydrolysis of the thiocarbonate, begins to oxidize to sodium thiosulfate at low temperatures.

$$2NaHS + 2O_2 \rightarrow Na_2S_2O_3 + H_2O \quad (3)$$

If the pH of the liquor in the wet air oxidation system is below a value of 3, pH <3, thiosulfate can undergo a disproportionation reaction as follows:

$$Na_2S_2O_3 \rightarrow Na_2SO_3 + S \quad (4)$$

The resulting elemental sulfur, S, is resistant to oxidation at the temperatures that were used in the present wet air oxidation tests.

An interpretation of the results of the above $2^3$ experimentally designed test matrix shows that the concentration of the total reduced sulfur species (TRS), which is the sum of $CS_3^=$, $S^=$, $S_2O_3^=$, and $SO_3^=$, can be expressed in mg/L by the mathematical expression as $$TRS = 162.1 - 124.6 \left( \frac{NaOH - 25 \text{ g/L}}{5 \text{ g/L}} \right) - 135.8 \left( \frac{Temp - 200^\circ C.}{50^\circ C.} \right) - 105.5 \left( \frac{time - 37.5 \text{ min}}{22.5 \text{ min}} \right)$$

where NaOH is the amount of NaOH added in grams per liter, Temp is the temperature in ° C. at which the wet air oxidation reaction was conducted, and time is the time at temperature in minutes. The expression was based on statistical analysis techniques. Such techniques have been described by, for example, J. S. Hunter in "Applications of Statistics to Experimentation," a presentation before the American Institute of Chemical Engineers Meeting in Montreal, Canada on Apr. 20-23, 1958. This expression indicates that the concentration of total reduced sulfur in the wet air oxidized effluent decreases as the amount of NaOH that is added increases. Also, the concentration of total reduced sulfur in the wet air oxidized effluent decreases as the oxidation temperature increases. Lastly, the concentration of total reduced sulfur in the wet air oxidized effluent decreases as the time at temperature increases.

Based upon the results of the above wet air oxidation tests, the wet air oxidation conditions that can produce acceptable reduced sulfur conversion in treatment of alkaline viscose mother liquor include: a reactor temperature in the range of about 150° C. to about 250° C., preferably a reactor temperature in the range of about 175° C. to about 225° C.; time at temperature or nominal residence time in the reactor in the range of 15 minutes to 60 minutes; and the pH of the oxidized effluent in a range of about 3 to about 10, and, preferably, from about 3 to about 7.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the invention. More generally, those skilled in the art would readily appreciate that all parameters, dimensions, materials, and configurations described herein are meant to be exemplary and that actual parameters, dimensions, materials, and configurations will depend upon specific applications for which the teachings of the invention are used. For example, in accordance with one or more embodiments of the invention, one or more wet oxidation systems can be coupled with one or more viscose process systems. Moreover, one or more viscose process systems can be connected to one or more wet oxidation systems in series or parallel flow arrangements, or combinations thereof. Those skilled in the art will recognize, or be able to ascertain using no more than routine experimentation, many equivalents to the specific embodiments of the invention described herein. For example, the invention can further promote oxidation of reduced sulfur species by utilizing one or more catalysts. Moreover, those skilled in the art would recognize that ancillary systems and/or devices can be utilized in the invention. For example, the safety systems would be typically utilized in where necessary such as safety relief devices that allow controlled release of uncontrolled or undesirable high pressure or vacuum conditions in any unit operation of the invention. It is, therefore, to be understood that the foregoing embodiments are presented by way of example only and that, within the scope of the appended claims and equivalents thereto, the invention may be practiced otherwise than as specifically described. The invention is directed to each individual feature, system, material and/or method described herein. In addition, any combination of two or more such features, systems, materials and/or methods, if such features, systems, materials and/or methods are not mutually inconsistent, is included within the scope of the invention.

In the claims (as well as in the specification above), all transitional phrases such as "comprising," "including," "carrying," "having," "containing," "involving," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A method of treating a viscose process stream comprising:
    providing a viscose process stream comprising a reduced sulfur compound;
    oxidizing the reduced sulfur compound to form a treated alkali metal sulfate liquid stream comprising a pH of less than about 5;
    recovering alkali metal sulfate from the treated liquid stream, wherein recovering comprises crystallizing alkali metal sulfate; and
    introducing at least a portion of the recovered, crystallized alkali metal sulfate into the viscose process.

2. A method of treating reduced sulfur compounds in a viscose process stream comprising steps of:
    forming an alkaline solution of sodium cellulose xanthate;
    treating the sodium cellulose xanthate solution to produce a regenerated cellulose material and at least one stream comprising reduced sulfur compounds;
    oxidizing in a liquid phase the at least one stream comprising reduced sulfur compounds with air while maintaining about 5% to about 9% oxygen concentration in the off-gas, at an elevated temperature in the range of about 200° C. to about 220° C. and superatmospheric pressure for a duration of at least about 15 minutes, to produce a treated liquid stream comprising a pH of less than about 5, the treated liquid stream comprising sodium sulfate;
    crystallizing sodium sulfate from the treated liquid stream; and
    introducing at least a portion of the crystallized sodium sulfate to the viscose process.

3. A method of wet oxidation of a viscose process mother liquor comprising:
    retrieving the viscose process mother liquor comprising at least one reduced sulfur species selected from the group consisting of carbon disulfide, hydrogen sulfide, sodium thiocarbonate, sodium thiosulfate, and sodium sulfite;
    adding a viscose process spent caustic solution to the viscose process mother liquor;
    oxidizing at least a portion of the reduced sulfur species at a pressure sufficient to produce a treated alkali sulfate stream having a pH of less than about 5, and a temperature between about 200° C. to about 220° C.;
    crystallizing alkali sulfate species from the alkali sulfate stream; and
    introducing the alkali sulfate into a viscose process system.

4. The method of claim 3, wherein the pressure is above atmospheric pressure.

5. The method of claim 4, wherein the alkali sulfate stream comprises sodium sulfate.

* * * * *